United States Patent
Bowen et al.

[11] Patent Number: 6,058,713
[45] Date of Patent: May 9, 2000

[54] LNG FUEL STORAGE AND DELIVERY SYSTEMS FOR NATURAL GAS POWERED VEHICLES

[75] Inventors: Ronald R. Bowen, Magnolia; Moses Minta, Sugar Land, both of Tex.

[73] Assignee: ExxonMobil Upstream Research Company, Houston, Tex.

[21] Appl. No.: 09/099,736

[22] Filed: Jun. 18, 1998

Related U.S. Application Data

[60] Provisional application No. 60/050,280, Jun. 20, 1997, provisional application No. 60/053,966, Jul. 28, 1997, and provisional application No. 60/068,198, Dec. 19, 1997.

[51] Int. Cl.[7] .................................................. F25B 19/00
[52] U.S. Cl. .................................... 62/7; 62/50.2; 62/46.1
[58] Field of Search ........................... 62/7, 46.1, 50.2; 220/749; 148/336; 420/92

[56] References Cited

U.S. PATENT DOCUMENTS

| | | | |
|---|---|---|---|
| 2,004,074 | 6/1935 | Kiley | 220/85 |
| 2,763,397 | 9/1956 | Rice | 220/85 |
| 2,795,937 | 6/1957 | Sattler et al. | 62/1 |
| 3,097,294 | 7/1963 | Kubli et al. | 219/145 |
| 3,232,725 | 2/1966 | Secord et al. | 48/190 |
| 3,298,805 | 1/1967 | Secord et al. | 48/190 |
| 3,477,509 | 11/1969 | Arendt | 166/252 |
| 3,565,201 | 2/1971 | Petsinger | 180/54 |
| 3,745,322 | 7/1973 | Ito et al. | 219/137 |
| 3,853,611 | 12/1974 | Godai et al. | 117/205 |
| 3,864,918 | 2/1975 | Lorenz | 60/651 |
| 3,931,908 | 1/1976 | Cheyney | 220/71 |

(List continued on next page.)

FOREIGN PATENT DOCUMENTS

| | | |
|---|---|---|
| 7-331328 | 12/1995 | Japan . |
| 8-176659A | 7/1996 | Japan . |
| 8-295982A | 11/1996 | Japan . |
| 1522609 | 8/1978 | United Kingdom . |

OTHER PUBLICATIONS

S. G. Ladkany, "Composite Aluminum–Fiberglass Epoxy Pressure Vessels for Transportation of LNG at Intermediate Temperature", published in *Advances in Cryogenic Engineering, Materials, vol. 28, (Proceedings of the 4th International Cryogenic Materials Conference)*, San Diego, CA, USA, Aug. 10–14, 1981, pp. 905–913.

Roger Ffooks, "Natural Gas by Sea The Development of a New Technology", published 1983 (second edition) by Witherby & Co. Ltd., Chapter 14, especially pp. 162–164 and 175–176. (month of publication not provided; year of publication is sufficiently earlier than priority date that month of publication not in issue).

R. J. Broeker, "A New Process for the Transportation of Natural Gas", International LNG Conference, Chicago, Apr. 1968, Session No. 5, Paper No. 30.

C. P. Bennett, "Marine Transportation of LNG at intermediate temperature", CME, Mar. 1979, pp. 63–64.

E. K. Faridany et al., "The Ocean Phoenix Pressure–LNG System", Gastech 1976, pp. 267–280. (month of publication not provided; year of publication is sufficiently earlier than priority date that month of publication not in issue).

(List continued on next page.)

*Primary Examiner*—Ronald Capossela
*Attorney, Agent, or Firm*—Marcy Lyles

[57] ABSTRACT

Fuel storage and delivery systems are provided for storing pressurized liquefied natural gas (PLNG) fuel at a pressure of about 1035 kPa (150 psia) to about 7590 kPa (1100 psia) and at a temperature of about −123° C. (−190° F.) to about −62° C. (−80° F.) and delivering vaporized PLNG fuel on demand for combustion in an engine. The fuel storage and delivery systems have fuel storage containers that are constructed from ultra-high strength, low alloy steel containing less than 9 wt % nickel and having a tensile strength greater than 830 MPa (120 ksi) and a DBTT lower than about −73° C. (−100° F.). While not limited thereto, the present invention is especially useful for automobiles, buses, trucks and other vehicles with engines designed to operate through combustion of natural gas.

15 Claims, 2 Drawing Sheets

U.S. PATENT DOCUMENTS

| | | | |
|---|---|---|---|
| 3,967,465 | 7/1976 | Asselman et al. | 62/48 |
| 4,024,720 | 5/1977 | Dimentberg et al. | 62/55 |
| 4,068,113 | 1/1978 | Godai et al. | 219/146.23 |
| 4,162,158 | 7/1979 | Hwang et al. | 75/124 |
| 4,182,254 | 1/1980 | Secord | 114/74 |
| 4,257,808 | 3/1981 | Morris, Jr. et al. | 75/123 N |
| 4,259,846 | 4/1981 | Rudolphi et al. | 62/48 |
| 4,315,407 | 2/1982 | Creed et al. | 62/53 |
| 4,374,478 | 2/1983 | Secord | 73/836.31 |
| 4,459,929 | 7/1984 | Ffooks | 114/74 |
| 4,687,525 | 8/1987 | Biniasz et al. | 148/336 |
| 4,776,900 | 10/1988 | Yano et al. | 148/12 R |
| 5,127,230 | 7/1992 | Neeser et al. | 62/7 |
| 5,183,633 | 2/1993 | Thierry et al. | 420/92 |
| 5,199,266 | 4/1993 | Johansen | 62/8 |
| 5,228,295 | 7/1993 | Gustafson | 62/7 |
| 5,327,730 | 7/1994 | Myers et al. | 62/9 |
| 5,373,700 | 12/1994 | McIntosh | 62/48.1 |
| 5,421,162 | 6/1995 | Gustafson et al. | 62/7 |
| 5,484,098 | 1/1996 | Anttila et al. | 228/184 |
| 5,531,842 | 7/1996 | Koo et al. | 148/654 |
| 5,545,269 | 8/1996 | Koo et al. | 148/654 |
| 5,545,270 | 8/1996 | Koo et al. | 148/654 |
| 5,582,218 | 12/1996 | Beale | 141/3 |
| 5,590,535 | 1/1997 | Rhoades | 62/50.2 |
| 5,755,895 | 5/1998 | Tamehiro et al. | 148/336 |
| 5,762,119 | 6/1998 | Platz et al. | 141/231 |
| 5,798,004 | 8/1998 | Tamehiro et al. | 148/336 |
| 5,878,814 | 3/1999 | Breivik et al. | 166/267 |
| 5,884,488 | 3/1999 | Gram et al. | 62/50.6 |

OTHER PUBLICATIONS

E. K. M. Fairdany et al., "A Pressure LNG System", European Offshore Petroleum Conference & Exhibition, Oct. 21–24, 1980, vol. EUR 171, pp. 245–254.

Broeker, R. J. "CNG and MLG—New Natural Gas Transportation Process", pp. 138–140, American Gas Journal, Jul. 1969.

Prof. E. F. Fluggen and Dr. I. H. Backhaus, "Pressurised LNG—and the Utilisation of Small Gas Fields", Gastech 78 LNG/LPG Conference (Monte Carlo, Nov. 7–10, 1978) Proceedings, pp. 195–204.

Reference cited by the Taiwan Patent Office in counterpart application, reference title –"Electronic Welding Operation Handbook Part 1", 1994, pp. 33–41; English language translations of relevant portions as provided by Applicant's agent in Taiwan.

Referenced city by the Taiwan Patent Office in counterpart application, reference title –"Welding Handbood vol. 2", 1993, pp. 190–95; English language translations of relevant portions as provided by Applicant's agent in Taiwan.

K. E. Dorschu et al., "Development of a Filler Metal for a High—Toughness Alloy Plate Steel with a Minimum Yield Strength of 140 ksi", The Welding Journal, Dec. 1964, pp. 564s–575s.

G. G. Saunders, "effect of Major Alloying Elements on the Toughness of high Strength Weld Metal", Welding Research International, vol. 7, No. 2, 1977, pp. 91–118.

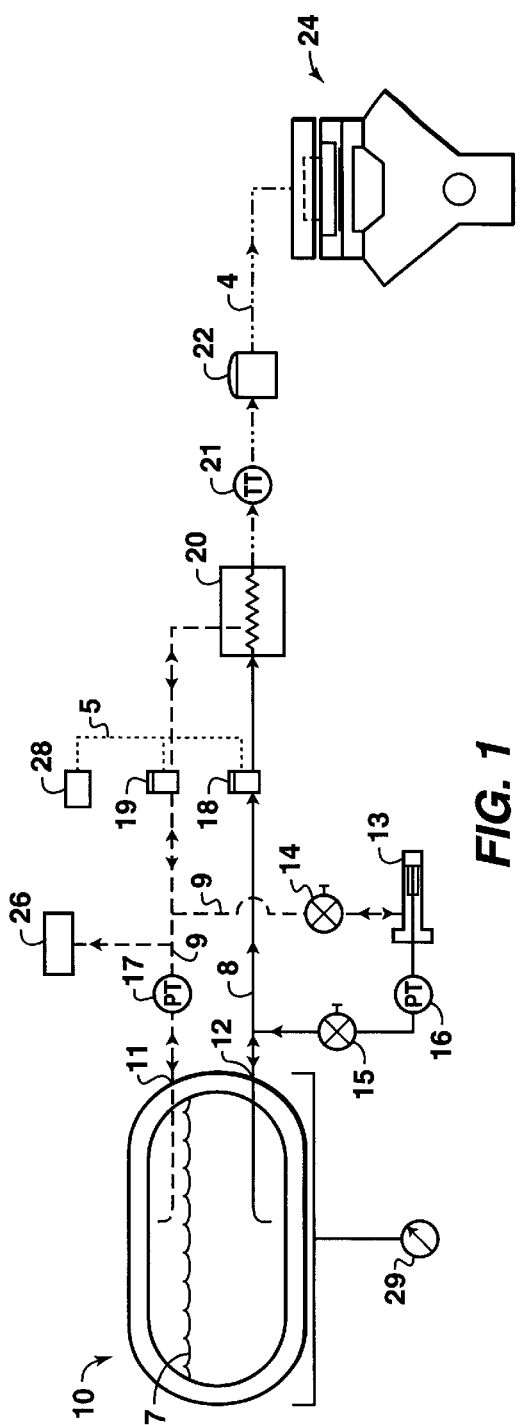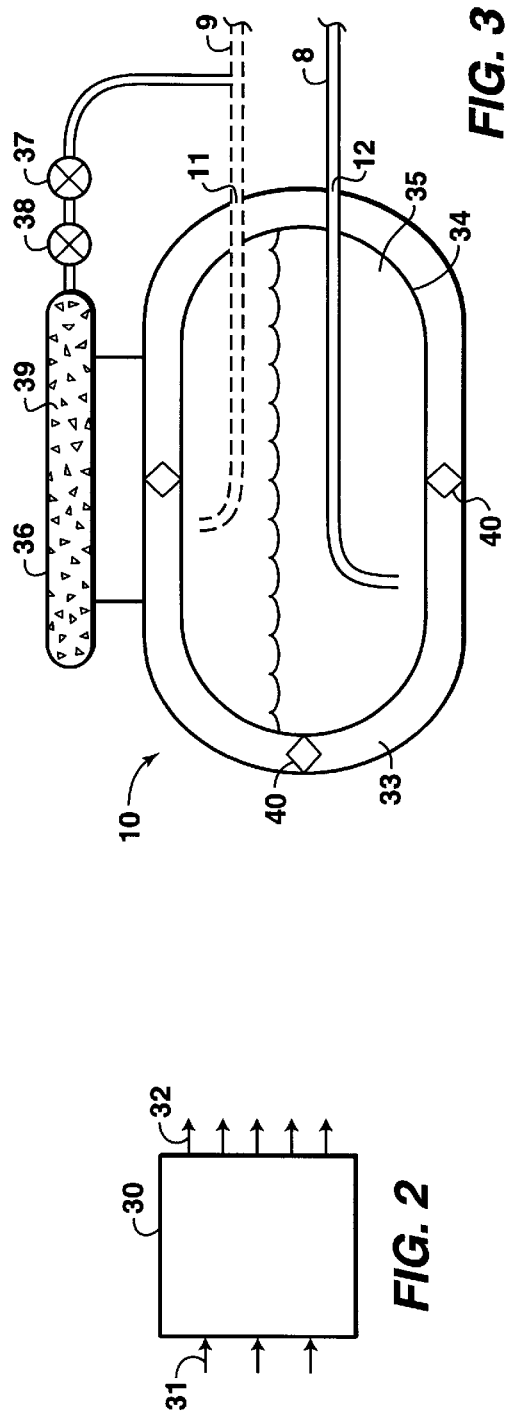

LNG FUEL STORAGE AND DELIVERY SYSTEMS FOR NATURAL GAS POWERED VEHICLES

This application claims the benefit of (i) U.S. Provisional Application No. 60/050280, filed Jun. 20, 1997; (ii) U.S. Provisional Application No. 60/053966, filed Jul. 28, 1997; and (iii) U.S. Provisional Application No. 60/068198, filed Dec 19, 1997.

FIELD OF THE INVENTION

This invention relates to fuel storage and delivery systems for storing pressurized liquefied natural gas (PLNG) fuel and delivering vaporized PLNG fuel on demand for combustion in an engine. More particularly, the present invention relates to such fuel storage and delivery systems having fuel storage containers that are constructed from ultra-high strength, low alloy steels containing less than 9 wt % nickel and that have adequate strength and cryogenic temperature fracture toughness to contain the PLNG fuel. While not limited thereto, the present invention is especially useful for automobiles, buses, trucks and other vehicles with engines designed to operate through combustion of natural gas.

BACKGROUND OF THE INVENTION

Various terms are defined in the following specification. For convenience, a Glossary of terms is provided herein, immediately preceding the claims.

Laws such as the Clean Air Act (1990) and the Energy Policy Act (1992), which mandate the purchase of alternative fueled vehicles (AFVs), have spurred several serious business initiatives to develop natural gas vehicles (NGVs). Although these laws were motivated by air quality issues, they have created economic incentives that have spurred real activity in implementing NGVs. NGVs currently hold the most competitive potential alternative to gasoline-powered vehicles because of the inherent clean-burning characteristics of natural gas.

Three competing technologies for the implementation of NGV-type AFVs are: compressed natural gas (CNG), liquefied natural gas (LNG), and liquefied petroleum gas (LPG). In CNG technology, the gaseous (natural gas) fuel is stored at very high pressures of about 20684 kPa to 24132 kPa (3000–3500 psia). There are at least four major shortcomings of CNG technology that have limited its successful deployment: short vehicle driving range (due to low energy storage per fuel storage container volume); safety issues associated with the high storage pressures; the weight and high cost of the on-board (and typically non-conformable) fuel storage containers; and the high cost of the refueling stations which must include high pressure ratio compression systems. LNG technology overcomes the low energy density limitation of CNG in that much more energy can be stored per unit volume. Other advantages of LNG over CNG include lower vehicle fuel system weight and higher fuel storage volume capability. For example, the weight of a typical on-board fuel storage system filled with CNG is over 2.5 times that of a typical LNG system. However, the extremely cold storage temperature of 162° C. (−260° F.) required for an LNG system results in high costs of the fuel storage containers which are typically made out of expensive special alloys, such as commercial nickel-containing steels (e.g., 9 wt % nickel), or aluminum alloys (e.g., Al-5083). Further, the need to deliver pressurized natural gas to an engine's fuel injectors adds to the complexity and cost of the fuel delivery system. A recent solicitation from the DOE's Brookhaven National Laboratory on LNG technology for NGV's highlights the need for an LNG delivery system for medium-pressure fuel injectors. An alternative to LNG with similar clean burning characteristics is liquefied petroleum gas (LPG). LPG overcomes the limitations of both CNG and LNG in that LPG offers higher energy storage per vessel volume than either CNG or LNG and operates at relatively low pressures (about 827 kPa (120 psia)), as compared to CNG, and at ambient temperatures. However, LPG supply is limited and LPG is much more expensive than LNG.

A co-pending U.S. patent Applications (the "PLNG Patent Applications"), entitled "Improved System for Processing, Storing, and Transporting Liquefied Natural Gas", describes containers and tanker ships for storage and marine transportation of pressurized liquefied natural gas (PLNG) at a pressure in the broad range of about 1035 kPa (150 psia) to about 7590 kPa (1100 psia) and at a temperature in the broad range of about −123° C. (−190° F.) to about −62° C. (−80° F.). The PLNG Patent Application has a priority date of Jun. 20, 1997 and is identified by the United States Patent and Trademark Office ("USPTO") as Application No. 09/099268 and has been published in WO 98/59085. Additionally, the PLNG Patent Application describe systems and containers for processing, storing, and transporting PLNG.

PLNG offers an alternative, cost-effective vehicular fuel source that provides the clean-burning advantages of CNG, LNG, and LPG. In addition, PLNG offers higher energy storage per fuel storage container volume than CNG, is less expensive to process than LNG, and overcomes the limited supply disadvantage of LPG. However, to our knowledge, no fuel storage and delivery systems are currently available for economically storing PLNG fuel and delivering vaporized PLNG fuel on demand for combustion in a vehicle engine. If such a fuel storage and delivery system were available, PLNG would offer a vehicular fuel source that overcomes the principal disadvantages of CNG, LNG, and LPG. A need exists for a fuel storage and delivery system to economically store PLNG fuel and deliver vaporized PLNG fuel on demand for combustion in an engine.

Consequently, the primary object of the present invention is to provide fuel storage and delivery systems suitable for storing PLNG fuel and delivering vaporized PLNG fuel on demand for combustion in an engine.

SUMMARY OF THE INVENTION

Consistent with the above-stated objects of the present invention, fuel storage and delivery systems are provided for storing pressurized liquefied natural gas (PLNG) fuel at a pressure of about 1035 kPa (150 psia) to about 7590 kPa (1100 psia) and at a temperature of about −123° C. (−190° F.) to about −62° C. (−80° F.) and delivering vaporized PLNG fuel on demand for combustion in an engine. Preferably, the PLNG fuel is stored at a pressure of about 1725 kPa (250 psia) to about 7590 kPa (1100 psia) and at a temperature of about −112° C. (−170° F.) to about −62° C. (−80° F). More preferably, the PLNG fuel is stored at a pressure in the range of about 2415 kPa (350 psia) to about 4830 kPa (700 psia) and at a temperature in the range of about −101° C. (−150° F.) to about −79° C. (−110° F.). Even more preferably, the lower ends of the pressure and temperature ranges for the PLNG fuel are about 2760 kPa (400 psia) and about −96° C. (−140° F.). The fuel storage and delivery systems of this invention have fuel storage containers and other system components that are constructed from materials comprising an ultra-high strength, low alloy steel containing less than 9 wt % nickel and having adequate strength and fracture toughness to contain said pressurized liquefied natural gas. The steel has an ultra-high strength, e.g., tensile strength (as defined herein) greater than 830 MPa (120 ksi), and a DBTT (as defined herein) lower than about −73° C. (−100° F.).

DESCRIPTION OF THE DRAWINGS

The advantages of the present invention will be better understood by referring to the following detailed description and the attached drawings in which:

FIG. 1 is a schematic illustration of a fuel storage and delivery system of the present invention connected to an engine;

FIG. 2 is a schematic illustration of a microprocessor (CPU) used for fuel management in a fuel storage and delivery system of the present invention; and FIG. 3 is a detailed illustration of a fuel storage container and associated fuel cartridge used in a fuel storage and delivery system of the present invention.

Figure 4A:
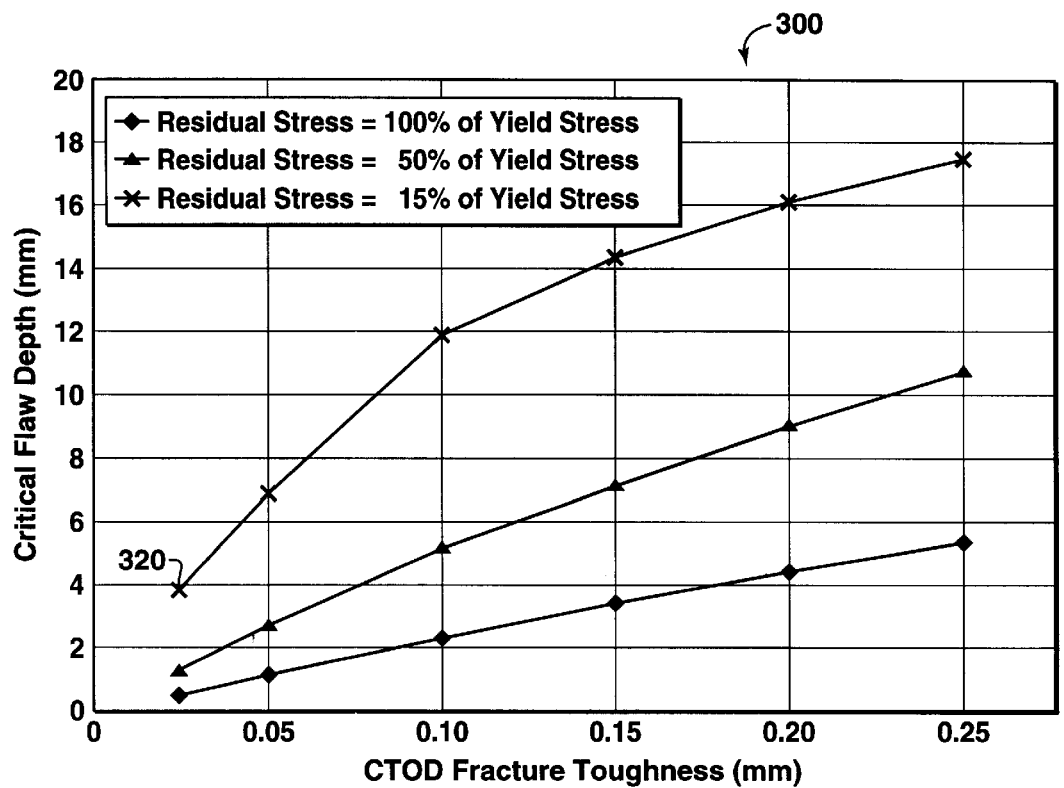
FIG. 4A illustrates a plot of critical flaw depth, for a given flaw length, as a function of CTOD fracture toughness and of residual stress.

While the invention will be described in connection with its preferred embodiments, it will be understood that the invention is not limited thereto. On the contrary, the invention is intended to cover all alternatives, modifications, and equivalents which may be included within the spirit and scope of the invention, as defined by the appended claims.

DETAILED DESCRIPTION OF THE INVENTION

The present invention relates to fuel storage and delivery systems, and individual components thereof, for storing PLNG fuel and delivering vaporized PLNG fuel on demand for combustion in a vehicle engine. Fuel storage and delivery systems are provided for storing pressurized liquefied natural gas (PLNG) fuel at a pressure of about 1035 kPa (150 psia) to about 7590 kPa (1100 psia) and at a temperature of about −123° C. (−190° F.) to about −62° C. (−80° F.) and delivering vaporized PLNG fuel on demand for combustion in a vehicle engine, wherein the fuel storage and delivery systems have fuel storage containers and other components that are constructed from materials comprising an ultra-high strength, low alloy steel containing less than 9 wt % nickel and having a tensile strength greater than 830 MPa (120 ksi) and a DBTT lower than about −73° C. (−100° F.). Further, fuel storage and delivery systems are provided for storing PLNG fuel at a pressure of about 1725 kPa (250 psia) to about 4830 kPa (700 psia) and at a temperature of about −112° C. (−170° F.) to about −79° C. (−110° F.) and delivering vaporized PLNG fuel on demand for combustion in a vehicle engine, wherein the fuel storage and delivery systems have fuel storage containers and other components that (i) are constructed from materials comprising an ultra-high strength, low alloy steel containing less than 9 wt % nickel and (ii) have adequate strength and fracture toughness to contain said pressurized liquefied natural gas. Additionally, fuel storage and delivery systems are provided for storing PLNG fuel and delivering vaporized PLNG fuel on demand for combustion in a vehicle engine, wherein the fuel storage and delivery systems have fuel storage containers and other components that are constructed from materials comprising an ultra-high strength, low alloy steel containing less than 9 wt % nickel and having a tensile strength greater than 830 MPa (120 ksi) and a DBTT lower than about −73° C. (−100° F.). Further, fuel storage and delivery systems are provided for storing PLNG fuel and delivering vaporized PLNG fuel on demand for combustion in a vehicle engine, wherein the fuel storage and delivery systems have fuel storage containers and other components that (i) are constructed from materials comprising an ultra-high strength, low alloy steel containing less than 9 wt % nickel and (ii) have adequate strength and fracture toughness to contain said pressurized liquefied natural gas.

Steel for Construction of Fuel Storage and Delivery System Containers and Other Components Any ultra-high strength, low alloy steel containing less than 9 wt % nickel and having adequate toughness for containing cryogenic temperature fluids, such as PLNG, at operating conditions, according to known principles of fracture mechanics as described herein, may be used for constructing the fuel storage and delivery system containers and other components of this invention. An example steel for use in the present invention, without thereby limiting the invention, is a weldable, ultra-high strength, low alloy steel containing less than 9 wt % nickel and having a tensile strength greater than 830 MPa (120 ksi) and adequate toughness to prevent initiation of a fracture, i.e., a failure event, at cryogenic temperature operating conditions. Another example steel for use in the present invention, without thereby limiting the invention, is a weldable, ultra-high strength, low alloy steel containing less than about 3 wt % nickel and having a tensile strength of at least about 1000 MPa (145 ksi) and adequate toughness to prevent initiation of a fracture, i.e., a failure event, at cryogenic temperature operating conditions. Preferably these example steels have DBTTs of lower than about −73° C. (−100° F.).

Recent advances in steel making technology have made possible the manufacture of new, ultra-high strength, low alloy steels with excellent cryogenic temperature toughness. For example, three U.S. patents issued to Koo et al., 5,531,842, 5,545,269, and 5,545,270, describe new steels and methods for processing these steels to produce steel plates with tensile strengths of about 830 MPa (120 ksi), 965 MPa (140 ksi), and higher. The steels and processing methods described therein have been improved and modified to provide combined steel chemistries and processing for manufacturing ultra-high strength, low alloy steels with excellent cryogenic temperature toughness in both the base steel and in the heat affected zone (HAZ) when welded. These ultra-high strength, low alloy steels also have improved toughness over standard commercially available ultra-high strength, low alloy steels. The improved steels are described in a co-pending U.S. patent application entitled "ULTRA-HIGH STRENGTH STEELS WITH EXCELLENT CRYOGENIC TEMPERATURE TOUGHNESS", which has a priority date of Dec. 19, 1997 and is identified by the United States Patent and Trademark Office ("USPTO") as application No. 09/099649 and has been published in WO 99/32672; in a co-pending U.S. patent application entitled "ULTRA-HIGH STRENGTH AUSAGED STEELS WITH EXCELLENT CRYOGENIC TEMPERATURE TOUGHNESS", which has a priority date of Dec. 19, 1997 and is identified by the USPTO as application No. 09/099153 and has been published in WO 99/32670; and in a co-pending U.S. patent application entitled "ULTRA-HIGH STRENGTH DUAL PHASE STEELS WITH EXCELLENT CRYOGENIC TEMPERATURE TOUGHNESS", which has a priority date of Dec. 19, 1997 and is identified by the USPTO as Application Number 09/099649. (collectively, the "Steel Patent Applications").

The new steels described in the Steel Patent Applications, and further described in the examples below, are especially suitable for constructing the fuel storage and delivery system containers and other components of this invention in that the steels have the following characteristics, preferably for steel plate thicknesses of about 2.5 cm (1 inch) and greater: (i) DBTT lower than about −73° C. (−100° F.), preferably lower than about −107° C. (−160° F.), in the base steel and in the weld HAZ; (ii) tensile strength greater than 830 MPa (120 ksi), preferably greater than about 860 MPa (125 ksi), and more preferably greater than about 900 MPa (130 ksi); (iii) superior weldability; (iv) substantially uniform through-thickness microstructure and properties; and (v) improved toughness over standard, commercially available, ultra-high strength, low alloy steels. Even more preferably, these steels have a tensile strength of greater than about 930 MPa (135 ksi), or greater than about 965 MPa (140 ksi), or greater than about 1000 MPa (145 ksi).

First Steel Example

As discussed above, a copending U.S. provisional patent application, having a priority date of Dec. 19, 1997, entitled "Ultra-High Strength Steels With Excellent Cryogenic Temperature Toughness", and identified by the USPTO as application No. 60/068194, provides a description of steels suitable for use in the present invention. A method is provided for preparing an ultra-high strength steel plate having a microstructure comprising predominantly tempered fine-grained lath martensite, tempered fine-grained lower bainite, or mixtures thereof, wherein the method comprises the steps of (a) heating a steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (c) further reducing the steel plate in one or more hot rolling passes in a second temperature range below about the $T_{nr}$ temperature and above about the $Ar_3$ transformation temperature; (d) quenching the steel plate at a cooling rate of about 10° C. per second to about 40° C. per second (18° F./sec–72° F./sec) to a Quench Stop Temperature below about the $M_s$ transformation temperature plus 200° C. (360° F.); (e) stopping the quenching; and (f) tempering the steel plate at a tempering temperature from about 400° C. (752° F.) up to about the $Ac_1$ transformation temperature, preferably up to, but not including, the $Ac_1$ transformation temperature, for a period of time sufficient to cause precipitation of hardening particles, i.e., one or more of ε-copper, $Mo_2C$, or the carbides and carbonitrides of niobium and vanadium The period of time sufficient to cause precipitation of hardening particles depends primarily on the thickness of the steel plate, the chemistry of the steel plate, and the tempering temperature, and can be determined by one skilled in the art. (See Glossary for definitions of predominantly, of hardening particles, of $T_{nr}$ temperature, of $Ar_3$, $M_s$, and $Ac_1$ transformation temperatures, and of $Mo_2C$.)

To ensure ambient and cryogenic temperature toughness, steels according to this first steel example preferably have a microstructure comprised of predominantly tempered fine-grained lower bainite, tempered fine-grained lath martensite, or mixtures thereof. It is preferable to substantially minimize the formation of embrittling constituents such as upper bainite, twinned martensite and MA. As used in this first steel example, and in the claims, "predominantly" means at least about 50 volume percent. More preferably, the microstructure comprises at least about 60 volume percent to about 80 volume percent tempered fine-grained lower bainite, tempered fine-grained lath martensite, or mixtures thereof. Even more preferably, the microstructure comprises at least about 90 volume percent tempered fine-grained lower bainite, tempered fine-grained lath martensite, or mixtures thereof. Most preferably, the microstructure comprises substantially 100% tempered fine-grained lath martensite.

A steel slab processed according to this first steel example is manufactured in a customary fashion and, in one embodiment, comprises iron and the following alloying elements, preferably in the weight ranges indicated in the following Table I:

TABLE I

| Alloying Element | Range (wt %) |
| --- | --- |
| carbon (C) | 0.04–0.12, more preferably 0.04–0.07 |
| manganese (Mn) | 0.5–2.5, more preferably 1.0–1.8 |
| nickel (Ni) | 1.0–3.0, more preferably 1.5–2.5 |
| copper (Cu) | 0.1–1.5, more preferably 0.5–1.0 |
| molybdenum (Mo) | 0.1–0.8, more preferably 0.2–0.5 |
| niobium (Nb) | 0.02–0.1, more preferably 0.03–0.05 |
| titanium (Ti) | 0.008–0.03, more preferably 0.01–0.02 |
| aluminum (Al) | 0.001–0.05, more preferably 0.005–0.03 |
| nitrogen (N) | 0.002–0.005, more preferabiy 0.002–0.003 |

Vanadium (V) is sometimes added to the steel, preferably up to about 0.10 wt %, and more preferably about 0.02 wt % to about 0.05 wt %.

Chromium (Cr) is sometimes added to the steel, preferably up to about 1.0 wt %, and more preferably about 0.2 wt % to about 0.6 wt %.

Silicon (Si) is sometimes added to the steel, preferably up to about 0.5 wt %, more preferably about 0.01 wt % to about 0.5 wt %, and even more preferably about 0.05 wt % to about 0.1 wt %.

Boron (B) is sometimes added to the steel, preferably up to about 0.0020 wt %, and more preferably about 0.0006 wt % to about 0.0010 wt %.

The steel preferably contains at least about 1 wt % nickel. Nickel content of the steel can be increased above about 3 wt % if desired to enhance performance after welding. Each 1 wt % addition of nickel is expected to lower the DBTT of the steel by about 10° C. (18° F.). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferably substantially minimized in the steel. Phosphorous (P) content is preferably less than about 0.01 wt %. Sulfur (S) content is preferably less than about 0.004 wt %. Oxygen (0) content is preferably less than about 0.002 wt %.

In somewhat greater detail, a steel according to this first steel example is prepared by forming a slab of the desired composition as described herein; heating the slab to a temperature of from about 955° C. to about 1065° C. (1750° F.–1950° F.); hot rolling the slab to form steel plate in one or more passes providing about 30 percent to about 70 percent reduction in a first temperature range in which austenite recrystallizes, i.e., above about the $T_{nr}$ temperature, and further hot rolling the steel plate in one or more passes providing about 40 percent to about 80 percent reduction in a second temperature range below about the $T_{nr}$ temperature and above about the $Ar_3$ transformation temperature. The hot rolled steel plate is then quenched at a cooling rate of about 10° C. per second to about 40° C. per second (18° F./sec–72° F./sec) to a suitable QST (as defined in the Glossary) below about the $M_s$ transformation temperature plus 200° C. (360° F.), at which time the quenching is terminated. In one embodiment of this first steel example, the steel plate is then air cooled to ambient temperature. This processing is used to produce a microstructure preferably comprising predominantly fine-grained lath martensite, fine-grained lower bainite, or mixtures thereof, or, more preferably comprising substantially 100% fine-grained lath martensite.

The thus direct quenched martensite in steels according to this first steel example has high strength but its toughness can be improved by tempering at a suitable temperature from above about 400° C. (752° F.) up to about the $Ac_1$ transformation temperature. Tempering of steel within this temperature range also leads to reduction of the quenching stresses which in turn leads to enhanced toughness. While tempering can enhance the toughness of the steel, it normally leads to substantial loss of strength. In the present invention, the usual strength loss from tempering is offset by inducing precipitate dispersion hardening. Dispersion hardening from fine copper precipitates and mixed carbides and/or carbonitrides are utilized to optimize strength and toughness during the tempering of the martensitic structure. The unique chemistry of the steels of this first steel example allows for tempering within the broad range of about 400° C. to about 650° C. (750° F.–1200° F.) without any significant loss of the as-quenched strength. The steel plate is preferably tempered at a tempering temperature from above about 400° C. (752° F.) to below the $Ac_1$ transformation temperature for a period of time sufficient to cause precipitation of hardening particles (as defined herein). This processing facilitates transformation of the microstructure of the steel plate to predominantly tempered fine-grained lath martensite, tempered fine-grained lower bainite, or mixtures thereof. Again, the period of time sufficient to cause precipitation of hardening particles depends primarily on the thickness of the steel plate, the chemistry of the steel plate, and the tempering temperature, and can be determined by one skilled in the art.

Second Steel Example

As discussed above, a copending U.S. patent application, having a priority date of Dec. 19, 1997, entitled "Ultra-High Strength Ausaged Steels With Excellent Cryogenic Temperature Toughness", and identified by the USPTO as application No. 09/099153, provides a description of other steels suitable for use in the present invention. A method is provided for preparing an ultra-high strength steel plate having a micro-laminate microstructure comprising about 2 vol % to about 10 vol % austenite film layers and about 90 vol % to about 98 vol % laths of predominantly fine-grained martensite and fine-grained lower bainite, said method comprising the steps of: (a) heating a steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (c) further reducing the steel plate in one or more hot rolling passes in a second temperature range below about the $T_{nr}$ temperature and above about the $Ar_3$ transformation temperature; (d) quenching the steel plate at a cooling rate of about 10° C. per second to about 40° C. per second (18° F./sec–72° F./sec) to a Quench Stop Temperature (QST) below about the $M_s$ transformation temperature plus 100° C. (180° F.) and above about the $M_s$ transformation temperature; and (e) stopping said quenching. In one embodiment, the method of this second steel example further comprises the step of allowing the steel plate to air cool to ambient temperature from the QST. In another embodiment, the method of this second steel example further comprises the step of holding the steel plate substantially isothermally at the QST for up to about 5 minutes prior to allowing the steel plate to air cool to ambient temperature. In yet another embodiment, the method of this second steel example further comprises the step of slow-cooling the steel plate from the QST at a rate lower than about 1.0° C. per second (1.8SF/sec) for up to about 5 minutes prior to allowing the steel plate to air cool to ambient temperature. In yet another embodiment, the method of this invention further comprises the step of slow-cooling the steel plate from the QST at a rate lower than about 1.0° C. per second (1.8° F./sec) for up to about 5 minutes prior to allowing the steel plate to air cool to ambient temperature. This processing facilitates transformation of the microstructure of the steel plate to about 2 vol % to about 10 vol % of austenite film layers and about 90 vol % to about 98 vol % laths of predominantly fine-grained martensite and fine-grained lower bainite. (See Glossary for definitions of $T_{nr}$temperature, and of $Ar_3$ and MS transformation temperatures.)

To ensure ambient and cryogenic temperature toughness, the laths in the micro-laminate microstructure preferably comprise predominantly lower bainite or martensite. It is preferable to substantially minimize the formation of embrittling constituents such as upper bainite, twinned martensite and MA. As used in this second steel example, and in the claims, "predominantly" means at least about 50 volume percent. The remainder of the microstructure can comprise additional fine-grained lower bainite, additional fine-grained lath martensite, or ferrite. More preferably, the microstructure comprises at least about 60 volume percent to about 80 volume percent lower bainite or lath martensite. Even more preferably, the microstructure comprises at least about 90 volume percent lower bainite or lath martensite.

A steel slab processed according to this second steel example is manufactured in a customary fashion and, in one embodiment, comprises iron and the following alloying elements, preferably in the weight ranges indicated in the following Table II:

TABLE II

| Alloying Element | Range (wt %) |
| --- | --- |
| carbon (C) | 0.04–0.12, more preferably 0.04–0.07 |
| manganese (Mn) | 0.5–2.5, more preferably 1.0–1.8 |
| nickel (Ni) | 1.0–3.0, more preferably 1.5–2.5 |
| copper (Cu) | 0.1–1.0, more preferably 0.2–0.5 |
| molybdenum (Mo) | 0.1–0.8, more preferably 0.2–0.4 |
| niobium (M,) | 0.02–0.1, more preferably 0.02–0.05 |
| titanium (Ti) | 0.008–0.03, more preferably 0.01–0.02 |
| aluminum (Al) | 0.001–0.05, more preferably 0.005–0.03 |
| nitrogen (N) | 0.002–0.005, more preferably 0.002–0.003 |

Chromium (Cr) is sometimes added to the steel, preferably up to about 1.0 wt %, and more preferably about 0.2 wt % to about 0.6 wt %.

Silicon (Si) is sometimes added to the steel, preferably up to about 0.5 wt %, more preferably about 0.01 wt % to about 0.5 wt %, and even more preferably about 0.05 wt % to about 0.1 wt %.

Boron (B) is sometimes added to the steel, preferably up to about 0.0020 wt %, and more preferably about 0.0006 wt % to about 0.0010 wt %.

The steel preferably contains at least about 1 wt % nickel. Nickel content of the steel can be increased above about 3 wt % if desired to enhance performance after welding. Each 1 wt % addition of nickel is expected to lower the DBTT of the steel by about 110° C. (18° F.). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferably substantially minimized in the steel. Phosphorous (P) content is preferably less than about 0.01 wt %. Sulfur (S) content is preferably less than about 0.004 wt %. Oxygen (O) content is preferably less than about 0.002 wt %.

In somewhat greater detail, a steel according to this second steel example is prepared by forming a slab of the desired composition as described herein; heating the slab to a temperature of from about 955° C. to about 1065° C. (1750° F.–1950° F.); hot rolling the slab to form steel plate in one or more passes providing about 30 percent to about 70 percent reduction in a first temperature range in which austenite recrystallizes, i.e., above about the $T_{nr}$ temperature, and further hot rolling the steel plate in one or more passes providing about 40 percent to about 80 percent reduction in a second temperature range below about the $T_{nr}$ temperature and above about the $Ar_3$ transformation temperature. The hot rolled steel plate is then quenched at a cooling rate of about 10° C. per second to about 40° C. per second (18° F./sec–72° F./sec) to a suitable QST below about the $M_s$ transformation temperature plus 100° C. (180° F.) and above about the $M_s$ transformation temperature, at which time the quenching is terminated. In one embodiment of this second steel example, after quenching is terminated the steel plate is allowed to air cool to ambient temperature from the QST. In another embodiment of this second steel example, after quenching is terminated the steel plate is held substantially isothermally at the QST for a period of time, preferably up to about 5 minutes, and then air cooled to ambient temperature. In yet another embodiment, the steel plate is slow-cooled at a rate slower than that of air cooling, i.e., at a rate lower than about 1° C. per second (1.8° F./sec), preferably for up to about 5 minutes. In yet another embodiment, the steel plate is slow-cooled from the QST at a rate slower than that of air cooling, i.e., at a rate lower than about 1° C. per second (1.8° F./sec), preferably for up to about 5 minutes. In at least one embodiment of this second steel example, the $M_s$ transformation temperature is about 350° C. (662° F.) and, therefore, the $M_s$ transformation temperature plus 100° C. (180° F.) is about 450° C. (842° F.).

The steel plate may be held substantially isothermally at the QST by any suitable means, as are known to those skilled in the art, such as by placing a thermal blanket over the steel plate. The steel plate may be slow-cooled after quenching is terminated by any suitable means, as are known to those skilled in the art, such as by placing an insulating blanket over the steel plate.

Third Steel Example

As discussed above, a copending U.S. patent application, having a priority date of Dec. 19, 1997, entitled "Ultra-High Strength Dual Phase Steels With Excellent Cryogenic Temperature Toughness", and identified by the USPTO as application No. 09/099152, provides a description of other steels suitable for use in the present invention. A method is provided for preparing an ultra-high strength, dual phase steel plate having a microstructure comprising about 10 vol % to about 40 vol % of a first phase of substantially 100 vol % (i.e., substantially pure or "essentially") ferrite and about 60 vol % to about 90 vol % of a second phase of predominantly fine-grained lath martensite, fine-grained lower bainite, or mixtures thereof, wherein the method comprises the steps of (a) heating a steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (c) further reducing the steel plate in one or more hot rolling passes in a second temperature range below about the $T_{nr}$ temperature and above about the $Ar_3$ transformation temperature; (d) further reducing said steel plate in one or more hot rolling passes in a third temperature range below about the $Ar_3$ transformation temperature and above about the $Ar_1$ transformation temperature (i.e., the intercritical temperature range); (e) quenching said steel plate at a cooling rate of about 10° C. per second to about 40° C. per second (18° F./sec–72° F./sec) to a Quench Stop Temperature (QST) preferably below about the $M_s$ transformation temperature plus 200° C. (360° F.); and (f) stopping said quenching. In another embodiment of this third steel example, the QST is preferably below about the $M_s$ transformation temperature plus 100° C. (180° F.), and is more preferably below about 350° C. (662° F.). In one embodiment of this third steel example, the steel plate is allowed to air cool to ambient temperature after step (f). This processing facilitates transformation of the microstructure of the steel plate to about 10 vol % to about 40 vol % of a first phase of ferrite and about 60 vol % to about 90 vol % of a second phase of predominantly fine-grained lath martensite, fine-grained lower bainite, or mixtures thereof. (See Glossary for definitions of $T_{nr}$ temperature, and of $Ar_3$ and $Ar_1$ transformation temperatures.)

To ensure ambient and cryogenic temperature toughness, the microstructure of the second phase in steels of this third steel example comprises predominantly fine-grained lower bainite, fine-grained lath martensite, or mixtures thereof. It is preferable to substantially minimize the formation of embrittling constituents such as upper bainite, twinned martensite and MA in the second phase. As used in this third steel example, and in the claims, "predominantly" means at least about 50 volume percent. The remainder of the second phase microstructure can comprise additional fine-grained lower bainite, additional fine-grained lath martensite, or ferrite. More preferably, the microstructure of the second phase comprises at least about 60 volume percent to about 80 volume percent fine-grained lower bainite, fine-grained lath martensite, or mixtures thereof. Even more preferably, the microstructure of the second phase comprises at least about 90 volume percent fine-grained lower bainite, fine-grained lath martensite, or mixtures thereof.

A steel slab processed according to this third steel example is manufactured in a customary fashion and, in one embodiment, comprises iron and the following alloying elements, preferably in the weight ranges indicated in the following Table III:

TABLE III

| Alloying Element | Range (wt %) |
|---|---|
| carbon (C) | 0.04–0.12, more preferably 0.04–0.07 |
| manganese (Mn) | 0.5–2.5, more preferably 1.0–1.8 |
| nickel (Ni) | 1.0–3.O, more preferably 1.5–2.5 |
| niobium (Nb) | 0.02–0.1, more preferably 0.02–0.05 |
| titanium (Ti) | 0.008–0.03, more preferably 0.01–0.02 |
| aluminum (Al) | 0.001–0.05, more preferably 0.005–0.03 |
| nitrogen (N) | 0.002–0.005, more preferably 0.002–0.003 |

Chromium (Cr) is sometimes added to the steel, preferably up to about 1.0 wt %, and more preferably about 0.2 wt % to about 0.6 wt %.

Molybdenum (Mo) is sometimes added to the steel, preferably up to about 0.8 wt %, and more preferably about 0.1 wt % to about 0.3 wt %.

Silicon (Si) is sometimes added to the steel, preferably up to about 0.5 wt %, more preferably about 0.01 wt % to about 0.5 wt %, and even more preferably about 0.05 wt % to about 0.1 wt %.

Copper (Cu), preferably in the range of about 0.1 wt % to about 1.0 wt %, more preferably in the range of about 0.2 wt % to about 0.4 wt %, is sometimes added to the steel.

Boron (B) is sometimes added to the steel, preferably up to about 0.0020 wt %, and more preferably about 0.0006 wt % to about 0.0010 wt %.

The steel preferably contains at least about I wt % nickel. Nickel content of the steel can be increased above about 3 wt % if desired to enhance performance after welding. Each 1 wt % addition of nickel is expected to lower the DBTT of the steel by about 10° C. (180° F). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferably substantially minimized in the steel. Phosphorous (P) content is preferably less than about 0.01 wt %. Sulfur (S) content is preferably less than about 0.004 wt %. Oxygen (O) content is preferably less than about 0.002 wt %.

In somewhat greater detail, a steel according to this third steel example is prepared by forming a slab of the desired composition as described herein; heating the slab to a temperature of from about 955° C. to about 1065° C. (1750° F.–1950° F.); hot rolling the slab to form steel plate in one or more passes providing about 30 percent to about 70 percent reduction in a first temperature range in which austenite recrystallizes, i.e., above about the $T_{nr}$ temperature, further hot rolling the steel plate in one or more passes providing about 40 percent to about 80 percent reduction in a second temperature range below about the $T_{nr}$ temperature and above about the $Ar_3$ transformation temperature, and finish rolling the steel plate in one or more passes to provide about 15 percent to about 50 percent reduction in the intercritical temperature range below about the $Ar_3$ transformation temperature and above about the $Ar_1$ transformation temperature. The hot rolled steel plate is then quenched at a cooling rate of about 10° C. per second to about 40° C. per second (18° F./sec–72° F./sec) to a suitable Quench Stop Temperature (QST) preferably below about the $M_s$ transformation temperature plus 200° C. (360° F.), at which time the quenching is terminated. In another embodiment of this invention, the QST is preferably below about the $M_s$ transformation temperature plus 100° C. (180° F.), and is more preferably below about 350° C. (662° F.). In one embodiment of this third steel example, the steel plate is allowed to air cool to ambient temperature after quenching is terminated.

In the three example steels above, since Ni is an expensive alloying element, the Ni content of the steel is preferably less than about 3.0 wt %, more preferably less than about 2.5 wt %, more preferably less than about 2.0 wt %, and even more preferably less than about 1.8 wt %, to substantially minimize cost of the steel.

Other suitable steels for use in connection with the present invention are described in other publications that describe ultra-high strength, low alloy steels containing less than about I wt % nickel, having tensile strengths greater than 830 MPa (120 ksi), and having excellent low-temperature toughness. For example, such steels are described in a European Patent Application published Feb. 5, 1997, and having International application number: PCT/JP96/00157, and International publication number WO 96/23909 (08.08.1996 Gazette 1996/36) (such steels preferably having a copper content of 0.1 wt % to 1.2 wt %), and in a pending U.S. patent application with a priority date of Jul. 28, 1997, entitled "Ultra-High Strength, Weldable Steels with Excellent Ultra-Low Temperature Toughness", and identified by the USPTO as Application No. 09/123625 and published in WO 99/05335.

For any of the above-referenced steels, as is understood by those skilled in the art, as used herein "percent reduction in thickness" refers to percent reduction in the thickness of the steel slab or plate prior to the reduction referenced. For purposes of explanation only, without thereby limiting this invention, a steel slab of about 25.4 cm (10 inches) thickness may be reduced about 50% (a 50 percent reduction), in a first temperature range, to a thickness of about 12.7 cm (5 inches) then reduced about 80% (an 80 percent reduction), in a second temperature range, to a thickness of about 2.5 cm (1 inch). Again, for purposes of explanation only, without thereby limiting this invention, a steel slab of about 25.4 cm (10 inches) may be reduced about 30% (a 30 percent reduction), in a first temperature range, to a thickness of about 17.8 cm (7 inches) then reduced about 80% (an 80 percent reduction), in a second temperature range, to a thickness of about 3.6 cm (1.4 inch), and then reduced about 30% (a 30 percent reduction), in a third temperature range, to a thickness of about 2.5 cm (1 inch). As used herein, "slab" means a piece of steel having any dimensions.

For any of the above-referenced steels, as is understood by those skilled in the art, the steel slab is preferably reheated by a suitable means for raising the temperature of substantially the entire slab, preferably the entire slab, to the desired reheating temperature, e.g., by placing the slab in a furnace for a period of time. The specific reheating temperature that should be used for any of the above-referenced steel compositions may be readily determined by a person skilled in the art, either by experiment or by calculation using suitable models. Additionally, the furnace temperature and reheating time necessary to raise the temperature of substantially the entire slab, preferably the entire slab, to the desired reheating temperature may be readily determined by a person skilled in the art by reference to standard industry publications.

For any of the above-referenced steels, as is understood by those skilled in the art, the temperature that defines the boundary between the recrystallization range and non-recrystallization range, the $T_{nr}$ temperature, depends on the chemistry of the steel, and more particularly, on the reheating temperature before rolling, the carbon concentration, the niobium concentration and the amount of reduction given in the rolling passes. Persons skilled in the art may determine this temperature for each steel composition either by experiment or by model calculation. Likewise, the $Ac_1$, $Ar_1$, $Ar_3$, and $M_s$ transformation temperatures referenced herein may be determined by persons skilled in the art for each steel composition either by experiment or by model calculation.

For any of the above-referenced steels, as is understood by those skilled in the art, except for the reheating temperature, which applies to substantially the entire slab, subsequent temperatures referenced in describing the processing methods of this invention are temperatures measured at the surface of the steel. The surface temperature of steel can be measured by use of an optical pyrometer, for example, or by any other device suitable for measuring the surface temperature of steel. The cooling rates referred to herein are those at the center, or substantially at the center, of the plate thickness; and the Quench Stop Temperature (QST) is the highest, or substantially the highest, temperature reached at the surface of the plate, after quenching is stopped, because of heat transmitted from the mid-thickness of the plate. For example, during processing of experimental heats of a steel composition according to the examples provided herein, a thermocouple is placed at the center, or substantially at the center, of the steel plate thickness for center temperature measurement, while the surface temperature is measured by use of an optical pyrometer. A correlation between center temperature and surface temperature is developed for use during subsequent processing of the same, or substantially the same, steel composition, such that center temperature may be determined via direct measurement of surface temperature. Also, the required temperature and flow rate of the quenching fluid to accomplish the desired accelerated cooling rate may be determined by one skilled in the art by reference to standard industry publications.

A person of skill in the art has the requisite knowledge and skill to use the information provided herein to produce ultra-high strength, low alloy steel plates having suitable high strength and toughness for use in constructing the fuel storage and delivery system containers and other components of the present invention. Other suitable steels may exist or be developed hereafter. All such steels are within the scope of the present invention.

A person of skill in the art has the requisite knowledge and skill to use the information provided herein to produce ultra-high strength, low alloy steel plates having modified thicknesses, compared to the thicknesses of the steel plates produced according to the examples provided herein, while still producing steel plates having suitable high strength and suitable cryogenic temperature toughness for use in the system of the present invention. For example, one skilled in the art may use the information provided herein to produce a steel plate with a thickness of about 2.54 cm (1 inch) and suitable high strength and suitable cryogenic temperature toughness for use in constructing the containers and other components of the present invention. Other suitable steels may exist or be developed hereafter. All such steels are within the scope of the present invention.

When a dual phase steel is used in the construction of fuel storage and delivery system containers and other components according to this invention, the dual phase steel is preferably processed in such a manner that the time period during which the steel is maintained in the intercritical temperature range for the purpose of creating the dual phase structure occurs before the accelerated cooling or quenching step. Preferably the processing is such that the dual phase structure is formed during cooling of the steel between the $Ar_3$ transformation temperature to about the $Ar_1$ transformation temperature. An additional preference for steels used in the construction of containers according to this invention is that the steel has a tensile strength greater than 830 MPa (120 ksi) and a DBTT lower than about −73° C. (−100° F.) upon completion of the accelerated cooling or quenching step, i.e., without any additional processing that requires reheating of the steel such as tempering. More preferably the tensile strength of the steel upon completion of the quenching or cooling step is greater than about 860 MPa (125 ksi), and more preferably greater than about 900 MPa (130 ksi). In some applications, a steel having a tensile strength of greater than about 930 MPa (135 ksi), or greater than about 965 MPa (140 ksi), or greater than about 1000 MPa (145 ksi), upon completion of the quenching or cooling step is preferable.

Joining Methods for Construction of Fuel Storage and Delivery System Containers and other Components In order to construct the fuel storage and delivery system containers and other components of the present invention, a suitable method of joining the steel plates is required. Any joining method that will provide joints with adequate strength and toughness for the present invention, as discussed above, is considered to be suitable. Preferably, a welding method suitable for providing adequate strength and fracture toughness to contain the fluid being contained or transported is used to construct the containers and other components of the present invention. Such a welding method preferably includes a suitable consumable wire, a suitable consumable gas, a suitable welding process, and a suitable welding procedure. For example, both gas metal arc welding (GMAW) and tungsten inert gas (TIG) welding, which are both well known in the steel fabrication industry, can be used to join the steel plates, provided that a suitable consumable wire-gas combination is used.

In a first example welding method, the gas metal arc welding (GMAW) process is used to produce a weld metal chemistry comprising iron and about 0.07 wt % carbon, about 2.05 wt % manganese, about 0.32 wt % silicon, about 2.20 wt % nickel, about 0.45 wt % chromium, about 0.56 wt % molybdenum, less than about 110 ppm phosphorous, and less than about 50 ppm sulfur. The weld is made on a steel, such as any of the above-described steels, using an argon-based shielding gas with less than about 1 wt % oxygen. The welding heat input is in the range of about 0.3 kJ/mm to about 1.5 kJ/mm (7.6 kJ/inch to 38 kJ/inch). Welding by this method provides a weldment (see Glossary) having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

In another example welding method, the GMAW process is used to produce a weld metal chemistry comprising iron and about 0.10 wt % carbon (preferably less than about 0.10 wt % carbon, more preferably from about 0.07 to about 0.08 wt % carbon), about 1.60 wt % manganese, about 0.25 wt % silicon, about 1.87 wt % nickel, about 0.87 wt % chromium, about 0.51 wt % molybdenum, less than about 75 ppm phosphorous, and less than about 100 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (100° F.), preferably below about −96° C. (−140° F.), more preferably below about 106° C. (−160° F.), and even more preferably below about −115° C. (−175° F.).

In another example welding method, the tungsten inert gas welding (TIG) process is used to produce a weld metal chemistry containing iron and about 0.07 wt % carbon (preferably less than about 0.07 wt % carbon), about 1.80 wt % manganese, about 0.20 wt % silicon, about 4.00 wt % nickel, about 0.5 wt % chromium, about 0.40 wt % molybdenum, about 0.02 wt % copper, about 0.02 wt % aluminum, about 0.010 wt % titanium, about 0.015 wt % zirconium (Zr), less than about 50 ppm phosphorous, and less than about 30 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −1 06° C. (−1 60° F.), and even more preferably below about −115° C. (−175° F.).

Similar weld metal chemistries to those mentioned in the examples can be made using either the GMAW or the TIG welding processes. However, the TIG welds are anticipated to have lower impurity content and a more highly refined microstructure than the GMAW welds, and thus improved low temperature toughness.

A person of skill in the art has the requisite knowledge and skill to use the information provided herein to weld ultra-high strength, low alloy steel plates to produce joints having suitable high strength and fracture toughness for use in constructing the containers and other components of the present invention. Other suitable joining or welding methods may exist or be developed hereafter. All such joining or welding methods are within the scope of the present invention.

Construction of Fuel Storage and Delivery System Containers and other Components Without hereby limiting this invention: fuel storage and delivery system containers and other components (i) constructed from materials comprising ultra-high strength, low alloy steels containing less than 9 wt % nickel and (ii) having adequate strength and cryogenic temperature fracture toughness to contain PLNG are provided; further, containers and other components constructed from materials comprising ultra-high strength, low alloy steels containing less than 9 wt % nickel and having a tensile strength greater than 830 MPa (120 ksi) and a DBTT lower than about −73° C. (−100° F.), are provided; further, containers and other components (i) constructed from materials comprising ultra-high strength, low alloy steels containing less than about 3 wt % nickel and (ii) having adequate strength and cryogenic temperature fracture toughness to contain PLNG are provided; and further, containers and other components, (i) constructed from materials comprising ultra-high strength, low alloy steels containing less than about 3 wt % nickel and (ii) having tensile strengths exceeding about 1000 MPa (145 ksi) and DBTTs lower than about −73° C. (−100° F.), are provided. Such fuel storage and delivery system containers and other components are preferably constructed from the ultra-high strength, low alloy steels with excellent cryogenic temperature toughness described herein.

The fuel storage and delivery system containers and other components of this invention are preferably constructed from discrete plates of ultra-high strength, low alloy steel with excellent cryogenic temperature toughness. Where applicable, the joints of the containers and other components preferably have about the same strength and toughness as the ultra-high strength, low alloy steel plates. In some cases, an undermatching of the strength on the order of about 5% to about 10% may be justified for locations of lower stress. Joints with the preferred properties can be made by any suitable joining technique. Exemplary joining techniques described herein, under the subheading "Joining Methods for Construction of Containers and Other Components".

As will be familiar to those skilled in the art, the Charpy V-notch (CVN) test can be used for the purpose of fracture toughness assessment and fracture control in the design of containers for storing pressurized, cryogenic temperature fluids, such as PLNG, particularly through use of the ductile-to-brittle transition temperature (DBTT). The DBTT delineates two fracture regimes in structural steels. At temperatures below the DBTT, failure in the Charpy V-notch test tends to occur by low energy cleavage (brittle) fracture, while at temperatures above the DBTT, failure tends to occur by high energy ductile fracture. Containers that are constructed from welded steels for the storage of PLNG and for other load-bearing, cryogenic temperature service must have DBTTs, as determined by the Charpy V-notch test, well below the service temperature of the structure in order to avoid brittle failure. Depending on the design, the service conditions, and/or the requirements of the applicable classification society, the required DBTT temperature shift may be from 5° C. to 30° C. (9° F. to 54° F.) below the service temperature.

As will be familiar to those skilled in the art, the operating conditions taken into consideration in the design of containers constructed from a welded steel for storing and transporting pressurized, cryogenic fluids, such as PLNG, include among other things, the operating pressure and temperature, as well as additional stresses that are likely to be imposed on the steel and the weldments (see Glossary). Standard fracture mechanics measurements, such as (i) critical stress intensity factor ($K_{IC}$), which is a measurement of plane-strain fracture toughness, and (ii) crack tip opening displacement (CTOD), which can be used to measure elastic-plastic fracture toughness, both of which are familiar to those skilled in the art, may be used to determine the fracture toughness of the steel and the weldments. Industry codes generally acceptable for steel structure design, for example, as presented in the BSI publication "Guidance on methods for assessing the acceptability of flaws in fusion welded structures", often referred to as "PD 6493: 1991", may be used to determine the maximum allowable flaw sizes for the container based on the fracture toughness of the steel and weldment (including HAZ) and the imposed stresses on the container. A person skilled in the art can develop a fracture control program to mitigate fracture initiation through (i) appropriate container design to minimize imposed stresses, (ii) appropriate manufacturing quality control to minimize defects, (iii) appropriate control of life cycle loads and pressures applied to the container, and (iv) an appropriate inspection program to reliably detect flaws and defects in the container. A preferred design philosophy for the system of the present invention is "leak before failure", as is familiar to those skilled in the art. These considerations are generally referred to herein as "known principles of fracture mechanics."

The following is a non-limiting example of application of these known principles of fracture mechanics in a procedure for calculating critical flaw depth for a given flaw length for use in a fracture control plan to prevent fracture initiation in a container according to this invention.

Figure 4B:
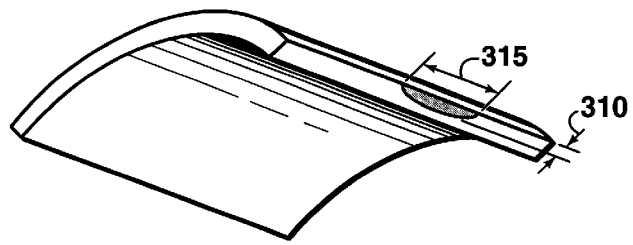
FIG. 4B illustrates the geometry (length and depth) of a flaw.

FIG. 4B illustrates a flaw of flaw length 315 and flaw depth 310. PD6493 is used to calculate values for the critical flaw size plot 300 shown in FIG. 4A based on the following design conditions for a pressure vessel or container:

Vessel Diameter: 4.57 m (15 ft)
Vessel Wall Thickness: 25.4 mm (1.00 in.)
Design Pressure: 3445 kPa (500 psi)
Allowable Hoop Stress: 333 MPa (48.3 ksi).

For the purpose of this example, a surface flaw length of 100 mm (4 inches), e.g., an axial flaw located in a seam weld, is assumed. Referring now to FIG. 4A, plot 300 shows the value for critical flaw depth as a function of CTOD fracture toughness and of residual stress, for residual stress levels of 15, 50 and 100 percent of yield stress. Residual stresses can be generated due to fabrication and welding; and PD6493 recommends the use of a residual stress value of 100 percent of yield stress in welds (including the weld HAZ) unless the welds are stress relieved using techniques such as post weld heat treatment (PWHT) or mechanical stress relief.

Based on the CTOD fracture toughness of the steel at the minimum service temperature, the container fabrication can be adjusted to reduce the residual stresses and an inspection program can be implemented (for both initial inspection and in-service inspection) to detect and measure flaws for comparison against critical flaw size. In this example, if the steel has a CTOD toughness of 0.025 mm at the minimum service temperature (as measured using laboratory specimens) and the residual stresses are reduced to 15 percent of the steel yield strength, then the value for critical flaw depth is approximately 4 mm (see point 320 on FIG. 4A). Following similar calculation procedures, as are well known to those skilled in the art, critical flaw depths can be determined for various flaw lengths as well as various flaw geometries. Using this information, a quality control program and inspection program (techniques, detectable flaw dimensions, frequency) can be developed to ensure that flaws are detected and remedied prior to reaching the critical flaw depth or prior to the application of the design loads. Based on published empirical correlations between CVN, $K_{IC}$ and CTOD fracture toughness, the 0.025 mm CTOD toughness generally correlates to a CVN value of about 37 J. This example is not intended to limit this invention in any way.

For containers and other components that require bending of the steel, e.g., into a cylindrical shape for a container or into a tubular shape for a pipe, the steel is preferably bent into the desired shape at ambient temperature in order to avoid detrimentally affecting the excellent cryogenic temperature toughness of the steel. If the steel must be heated to achieve the desired shape after bending, the steel is preferably heated to a temperature no higher than about 600° C. (1112° F.) in order to preserve the beneficial effects of the steel microstructure as described above.

EXAMPLE FUEL STORAGE AND DELIVERY SYSTEM

One embodiment of a fuel storage and delivery system according to this invention for storing PLNG fuel and delivering vaporized PLNG fuel on demand for combustion in a vehicle engine, and the unique advantages associated therewith, is described in detail below. Components of the fuel storage and delivery system, for example, the fuel storage container, liquid lines, vapor lines, and vaporizers, are preferably constructed from the low alloy, ultra-high strength steels with excellent cryogenic temperature toughness described herein, or from other steels having the desired characteristics described herein. For components that require bending of the steel, e.g., into a cylindrical shape for a container or into a tubular shape for a pipe, the steel is preferably bent into the desired shape at ambient temperature in order to avoid detrimentally affecting the excellent cryogenic temperature toughness of the steel. If the steel must be heated to achieve the desired shape after bending, the steel is preferably heated to a temperature no higher than about 600° C. (1112° F.) in order to preserve the beneficial effects of the steel microstructure as described above.

Components of Fuel Storage and Delivery System

Referring to FIG. 1, the fuel storage and delivery system of this example includes a fuel storage container IO. Fuel storage container 10 is preferably an insulated Dewar-type container. Fuel storage container 10 is connected to fill and vent valve 13 through, respectively, (i) vapor port 11, vapor line 9 (dashed), and vapor valve 14 and (ii) liquid port 12, liquid line 8 (solid), and liquid valve 15. Pressure transmitters 16 and 17 are inserted between fuel storage container 10 and fill and vent valve 13, respectively, in liquid line 8 and in vapor line 9. Fuel storage container 10 is connected to the inlet manifold of engine 24 through liquid port 12, liquid line 8, liquid solenoid valve 18, vaporizer 20, fuel line 4 (dash-dot-dot), and fuel regulator 22. Fuel storage container 10 is also connected to the inlet manifold of engine 24 through vapor port 11, vapor line 9, vapor solenoid valve 19, vaporizer 20, fuel line 4, temperature transmitter 21, and fuel regulator 22. Fuel storage container IO is also connected to safety relief valve 26 through vapor port 11 and vapor line 9. The fuel storage and delivery system of this example also includes a pressure switch 28 and a fuel gage 29. As used in the following description of the operation of the fuel storage and delivery system, "opened" in reference to a valve means "at least partially opened", unless otherwise specified.

Initial Filling of Fuel Storage Container

Prior to initial filling, fuel storage container 10 is typically at atmospheric pressure and ambient temperature. The initial filling of fuel storage container 10 is preferably controlled by a prescribed sequence. The prescribed sequence for the initial filling is preferably pre-programmed into CPU 30 (not shown in FIG. 1, see FIG. 2), for example, and in one embodiment is triggered by a manually operated switch (not shown in the drawings).

Typically, the prescribed sequence includes the following steps in the order set forth. First, in a cooldown cycle for fuel storage container 10, vapor valve 14 is opened to establish flow of vapor PLNG fuel from a refueling station (not shown in the drawings) through fill and vent valve 13, vapor line 9, and vapor port 11 into fuel storage container 10. This flow of vapor PLNG fuel is continued until the temperature in fuel storage container 10 reaches a pre-set temperature value. The pre-set temperature value is derived primarily from the cooldown curve and thermal contraction characteristics of the material from which fuel storage container 10 is constructed, and may be determined by those skilled in the art by reference to standard industry publications. This flow of vapor PLNG fuel into storage container 10 also increases the pressure in fuel storage container 10. When the temperature in fuel storage container 10 reaches the pre-set temperature value, liquid valve 15 is opened to allow the flow of liquid PLNG fuel from the refueling station through fill and vent valve 13, liquid line 8, and liquid port 12 into fuel storage container 10, for the final phase of the cooldown cycle. As the liquid PLNG fuel cools fuel storage container 10, the liquid PLNG fuel vaporizes and contributes to the pressure build-up. After the pressure of PLNG fuel in storage container 10 reaches a pre-set pressure value, based on the pressure differential between fuel storage container 10 and the refueling station, flow of vapor PLNG fuel reverses through vapor valve 14 (i.e., from fuel storage container 10 into the refueling station) and vapor valve 14 is then preferably fully opened to maintain the pressure equilibration between fuel storage container 10 and the refueling station. Liquid valve 15 is preferably fully opened when the temperature in fuel storage container 10 reaches a pre-set operating temperature value, i.e., as the cooldown cycle is completed. Liquid PLNG fuel continues to flow into fuel storage container 10, from the refueling station, displacing a substantially equal volume of vapor PLNG fuel from fuel storage container 10 back into the refueling station until a level sensor (not shown in the drawings) detects that liquid PLNG fuel in storage container 10 has reached a pre-set amount or volume, at which time both vapor valve 14 and liquid valve 15 are closed to end the initial filling process. As with cryogenic temperature fluid storage containers generally, at least about 10% vapor space is preferably available in fuel storage container 10 upon completion of the initial filling process, as is familiar to those skilled in the art of cryogenic temperature fluid storage.

System Refueling Process

Prior to the start of refueling, with both vapor valve 14 and liquid valve 15 closed, and fill and vent valve 13 opened, pressure transmitter 16 measures the pressure of PLNG fuel in the refueling station and communicates the pressure to CPU 30 (not shown in FIG. 1, see FIG. 2) as an input signal 31. Also, the pressure of PLNG fuel in storage container 10 is measured prior to the start of refueling, and is preferably continuously monitored during refueling, by pressure transmitter 17 and communicated to CPU 30 as an input signal 31. The pressure of PLNG fuel in the refueling station remains substantially constant during the refueling process, as compared to the pressure of PLNG fuel in storage container 10. Thus, CPU 30 continuously monitors the pressure differential between the refueling station and fuel storage container 10 during the refueling process. Further, CPU 30 preferably continuously monitors, i.e., receives as an input signal 31, the level of 7 liquid PLNG fuel in storage container 10 through a level sensor such as a tuned densitometer (not shown in the drawings). Also, CPU 30 is preferably pre-programmed with a set minimum refueling differential pressure, i.e., the minimum pressure differential necessary to ensure the desired flowrate of liquid PLNG fuel from the refueling station into storage container 10 without the aid of a pump. If the pressure differential between the refueling station and fuel storage container 10 is less than about the set minimum refueling differential pressure prior to the start of refueling, or decreases to less than about the set minimum refueling differential pressure during refueling, CPU 30 manages the refueling process appropriately to ensure that the set minimum fueling pressure differential is established. These pressure, pressure differential, liquid level, and set minimum refueling differential pressure values are used by CPU 30 in managing the refueling process by appropriately operating (opening/closing) valves 14, 15, 18, and 19.

The refueling sequence employed for the fuel storage and delivery system of this example is dependent upon the thermodynamic state of the PLNG fuel in storage container 10. As is further explained below, the start-up of the sequence varies depending on whether the pressure of PLNG fuel in storage container 10, added to the minimum refueling differential pressure, is lower than, equal to, or higher than, about the pressure of PLNG fuel in the refueling station.

Start-up when Fuel Storage Container Pressure, Added to Set Minimum Refueling Pressure, is Higher than Refueling Station Pressure When input signals 31 to CPU 30 indicate that the pressure of PLNG fuel in storage container 10, added to the set minimum refueling differential pressure, is higher than about the pressure of PLNG fuel in the refueling station, vapor valve 14 is first opened to allow flow of vapor PLNG fuel from fuel storage container 10 through vapor port 11, vapor line 9, and fill and vent valve 13 into the refueling station. Liquid valve 15 is opened when the pressure of PLNG fuel in storage container 10 substantially equilibrates with the pressure of PLNG fuel in the refueling station. Additionally, CPU 30 communicates to the refueling station, by means known to those skilled in the art, such as by electronic signal, to increase the pressure of PLNG fuel by at least the set minimum refueling differential pressure to establish flow of liquid PLNG fuel from the refueling station through fill and vent valve 13, liquid line 8, and liquid port 12 into fuel storage container 10.

Start-up when Fuel Storage Container Pressure, Added to Set Minimum Refueling Pressure, is Lower than or Equal to Refueling Station Pressure When input signals 31 to CPU 30 indicate that the pressure of PLNG fuel in storage container 10, added to the set minimum refueling differential pressure, is lower than or equal to about the pressure of PLNG fuel in the refueling station, liquid valve 15 is first opened to establish flow of liquid PLNG fuel from the refueling station through fill and vent valve 13 and liquid line 8 into fuel storage container 10 and to build up the pressure of PLNG fuel in storage container 10. Then vapor valve 14 is opened to allow vapor PLNG fuel in storage container 10 to flow into the refueling station.

CPU 30 is also preferably pre-programmed with a value for a set maximum pressure differential between PLNG fuel in storage container 10 and PLNG fuel in the refueling station. To avoid excessive temperature drop in PLNG fuel in storage container 10 due to Joule-Thomson cooling if this set maximum pressure differential is exceeded, with both vapor valve 14 and liquid valve 15 closed, liquid PLNG fuel from storage container 10 is vaporized in vaporizer 20 and returned to fuel storage container 10 for pressurization by appropriate operation (opening/closing) of liquid solenoid valve 18 and vapor solenoid valve 19 with fuel regulator 22 completely closed. Use of vaporizer 20 in this manner, with relatively short liquid line 8 and vapor line 9, is functionally equivalent to having a pressure maintaining device, such as a heater, in storage container 10. Solenoid valves 18 and 19 are both closed when the differential pressure between PLNG fuel in storage container 10 and in the refueling station is reduced below the set maximum pressure differential. Subsequently, liquid valve 15 is opened to establish flow of liquid PLNG fuel from the refueling station into fuel storage container 10. Then vapor valve 14 is opened to allow vapor PLNG fuel in storage container 10 to flow into the refueling station.

Completion of Refueling Process

In all cases, during refueling, if the pressure of PLNG fuel in storage container 10 decreases to below a pre-set minimum pressure value (also preferably pre-programmed into CPU 30), vapor valve 14 temporarily closes to allow the build up of pressure of PLNG fuel in storage container 10, preferably to at least the pre-set minimum pressure value. Otherwise, as liquid PLNG fuel flows into fuel storage container 10, vapor PLNG fuel is displaced from fuel storage container 10 through vapor port 11, vapor line 9, vapor valve 14, and fill and vent valve 13 to the refueling station. Vapor PLNG fuel displacement continues until a level sensor (not shown in the drawings) detects that liquid PLNG fuel in storage container 10 has reached a pre-set amount or volume, at which time both vapor valve 14 and liquid valve 15 are closed to end the refueling process. As with cryogenic temperature fluid storage containers generally, at least about 10% vapor space is preferably available in fuel storage container 10 during and upon completion of refueling, as is familiar to those skilled in the art of cryogenic temperature fluid storage.

Engine/Vehicle Operation

Normal Engine/Vehicle Operation

PLNG fuel demand to engine 24 is preferably managed by CPU 30. In case of CPU 30 malfunctioning, pressure switch 28 has override control over solenoid valves 18 and 19 via electrical connection 5. Typical input signals 31 to CPU 30 during normal engine 24 operation include engine 24 parameters such as: rpm and load; normal operating conditions of PLNG fuel in storage container 10, such as normal operating PLNG fuel temperature and pressure; vaporizer 20 outlet temperature; and fuel regulator 22 status (i.e., closed, open 10%, etc.). CPU 30 uses these input signals 31 to generate output signals 32 (see FIG. 2) for controlling fuel regulator 22, safety relief valve 26, and solenoid valves 18 and 19, to provide PLNG fuel through vapor port 11, vapor line 9, liquid port 12, liquid line 8, vaporizer 20, fuel line 4, and PLNG fuel regulator 22 to engine 24.

Demand for PLNG fuel from engine 24 for acceleration, for example, is met by supply of liquid PLNG fuel from storage container 10. Liquid solenoid valve 18 is opened to establish flow of liquid PLNG fuel through liquid port 12 and liquid line 8 into vaporizer 20, where the liquid PLNG fuel is vaporized and metered through fuel line 4 and fuel regulator 22, into the inlet manifold of engine 24. Vaporized PLNG fuel is supplied directly to the fuel injectors in the inlet manifold. The fuel injectors may be of the pulsation type, for example, as is familiar to those skilled in the art. Exceptionally high demand for PLNG fuel by engine 24 results in a correspondingly high efflux of liquid PLNG fuel from storage container 10, which under normal operating conditions results in a significant drop in pressure of PLNG fuel in storage container 10. Associated with the high pressure drop is a temperature drop. In one embodiment of this invention, to avoid any adverse effect on the performance of the material of construction of fuel storage container 10, e.g., caused by the temperature of the liquid PLNG fuel in storage container 10 dropping significantly below the DBTT of the material of construction, vapor solenoid valve 19 is opened to return higher temperature vaporized PLNG fuel into the vapor space in fuel storage container 10 and, thereby, substantially normalize the pressure and temperature of PLNG fuel in storage container 10. In another embodiment of this invention, a pressure maintenance device (not shown in FIG. 1), such as a heater, is an integral part of fuel storage container 10.

Under normal operating conditions for engine 24, which translates into normal demand for PLNG fuel, an appropriate amount of liquid PLNG fuel is supplied to engine 24 from fuel storage container 10. Liquid solenoid valve 18 is opened to establish flow of liquid PLNG fuel through liquid port 12 and liquid line 8 into vaporizer 20, where the liquid PLNG fuel is vaporized and metered through fuel line 4 and fuel regulator 22 into the inlet manifold of engine 24. The vaporized PLNG fuel is supplied directly to the fuel injectors in the inlet manifold. Again, the pressure of PLNG fuel in storage container 10 is monitored and vapor solenoid valve 19 is opened to return vaporized PLNG fuel into storage container 10, if necessary to assist in regulating the pressure and temperature of PLNG fuel in storage container 10.

Engine Idling Operation

Under reduced engine load conditions, such as during idling, the demand for PLNG fuel by engine 24 is correspondingly reduced. Under normal operating conditions of pressure and temperature of PLNG fuel in storage container 10, this reduced PLNG fuel demand is preferably met by vapor PLNG fuel supply from fuel storage container 10 through vapor port 11, vapor line 9, vaporizer 20 (on a pass-through basis), fuel line 4, and fuel regulator 22, and with liquid solenoid valve 18 closed.

When the pressure of PLNG fuel in storage container 10 is below normal operating pressure, the vapor PLNG fuel in storage container 10 is typically richer in methane (and nitrogen) than the liquid PLNG fuel. In cases where the nitrogen content in the PLNG fuel is significant, the heating value of the vapor PLNG fuel is typically lower than desired for smooth operation of engine 24. In such cases, when the pressure of PLNG fuel in storage container 10 is below normal operating pressure, PLNG fuel for idling is supplied from the liquid PLNG fuel and fuel regulator 22 is used to control the small amount of vaporized liquid PLNG fuel required during idling of engine 24. Simultaneously, vapor solenoid valve 19 is opened to allow vaporized PLNG fuel to also flow into fuel storage container 10 for pressure build-up. Preferably, CPU 30 manages the sequence of operation of the valves 18 and 19 to supply an appropriate amount of vaporized liquid PLNG fuel to engine 24 and to manage the pressure of PLNG fuel in storage container 10.

On the other hand, when the pressure of PLNG fuel in storage container 10 is higher than normal operating pressure, the composition difference between vapor PLNG fuel and liquid PLNG fuel in storage container 10 is reduced and the difference in heating value between the two phases is reduced correspondingly. In this particular case, vapor PLNG fuel is preferably supplied directly from fuel storage container 10 through vapor port 11, vapor line 9, vaporizer 20 (on a pass-through basis), fuel line 4, and fuel regulator 22 to engine 24 to reduce the pressure of PLNG fuel within storage container 10 to the normal operating pressure.

Engine Start-up Operation

The heating value of PLNG fuel in storage container 10 at start-up of engine 24 depends on the initial pressure of the PLNG fuel, i.e., the pressure immediately prior to start-up. The lower the pressure, the higher the likelihood that the vapor PLNG fuel is richer in the more volatile components, like methane and nitrogen, than the liquid PLNG fuel. In particular, if the nitrogen content in the vapor PLNG fuel is substantial, the heating value of the vapor PLNG fuel phase may be lower than needed to start engine 24. Under such lower pressure conditions, PLNG fuel for engine 24 start-up is preferably supplied from the liquid PLNG fuel in storage container 10. CPU 30 is preferably used to manage the sequence of operation of valves 18 and 19 to supply an appropriate amount of the appropriate phase, i.e., vapor or liquid, of PLNG fuel, and, indirectly, the appropriate composition of PLNG fuel, to engine 24.

On the other hand, as the pressure of PLNG fuel in storage container 10 increases, the composition difference between the vapor PLNG fuel and the liquid PLNG fuel is correspondingly reduced and the difference in heating value between the two phases is correspondingly reduced. In this particular case, vapor PLNG fuel is preferably supplied directly from fuel storage container 10 through vapor line 9, vaporizer 20 (on a pass-through basis), fuel regulator 22, and fuel line 4 to engine 24 to reduce the pressure of PLNG fuel in storage container 10.

Fuel Storage Tank

Referring now to FIG. 3, fuel storage container 10 is preferably designed to minimize boil-off of the liquid PLNG fuel. In one embodiment, fuel storage container 10 is vacuum insulated by vacuum insulation space 33 (see also spacer 40) to minimize convection heat leak, and a suitable high-emissivity coating on the exterior surface 34 of inner vessel 35 minimizes radiation heat leak. For the purpose of example only, without thereby limiting this invention, high-emissivity coating for exterior surface 34 comprises a single layer wrap of aluminized mylar. This substantially limits the heat leak into fuel storage container 10 to conduction heat leakage due to penetrations into inner vessel 35. In this embodiment, total penetrations are minimized by using two dual purpose lines, liquid line 8 and vapor line 9. Liquid line 8 is used to both fill and discharge liquid PLNG fuel from storage container 10; vapor line 9 is used to both fill and discharge vapor PLNG fuel from storage container 10. As is familiar to those skilled in the art of cryogenic engineering design, these special design strategies minimize, but do not eliminate completely, the heat leak into fuel storage container 10. Consequently, when engine 24 (FIG. 1) is not operating, such as when the vehicle powered by engine 24 is parked during periods of non-use, there is continual boil-off of the PLNG fuel in storage container 10. The continual boil-off results in an increase in pressure of the PLNG fuel in storage container 10. The design pressure of fuel storage container 10, in one embodiment, is optimized to maximize PLNG fuel hold time and minimize the weight of fuel storage container 10. Higher weights of fuel storage container 10 tend to reduce the fuel efficiency (i.e., miles per gallon) of the vehicle. Preferably, fuel storage container 10 is not designed to contain the full pressure resulting from complete vaporization and warm up to ambient temperature of PLNG fuel in storage container 10, because that would have an excessively detrimental weight impact on the vehicle fuel efficiency. Thus, a fuel venting mechanism is preferably provided.

Fuel Venting

The fuel storage and delivery system of this example is preferably provided with a fuel venting mechanism whereby vapor PLNG fuel is vented from fuel storage container 10, but is not released to the atmosphere. In one embodiment, two levels of protection are provided to achieve this. First, fuel storage container 10 is preferably designed to allow for pressure build up to about twice the operating pressure. Depending on the starting level 7 of liquid PLNG fuel in storage container 10, this high pressure design preferably allows for at least about ten days of liquid boil-off and the concomitant pressure build-up, i.e., at least about ten days of non-use of the fuel storage and delivery system, without the need to vent vapor PLNG fuel outside storage container 10. However, in the rather unusual case of an extended period of non-use starting with fuel storage container 10 substantially filled with liquid PLNG fuel, the pressure build-up may exceed the design pressure for fuel storage container 10. Fuel cartridge 36 provides a means to relieve the pressure in excess of the design pressure.

Referring now to FIG. 3, fuel cartridge 36 is connected to fuel storage container 10 through vapor port II and vapor line 9. Normally-opened solenoid valve 38 is an integral part of fuel cartridge 36. Fuel cartridge 36 is, however, normally isolated from vapor PLNG fuel in storage container 10, and in vapor line 9, by check valve 37. The set point pressure for CPU 30 to open check valve 37 depends on fuel storage container 10 design pressure. Check valve 37 is designed to allow flow of vapor PLNG fuel only from fuel storage container 10 into fuel cartridge 36 and to prevent back-flow of vapor PLNG fuel through vapor line 9 into engine 24 or fuel storage container 10. In one embodiment, fuel cartridge 36 contains an adsorbent, such as charcoal adsorbent 39, preferably capable of absorbing over 150 times its dead volume at ambient conditions of temperature and pressure. The amount of vapor PLNG fuel adsorbed onto charcoal adsorbent 39 varies according to the temperature and pressure to which charcoal adsorbent 39 is exposed. The vapor PLNG fuel holding capacity of charcoal adsorbent 39 increases as the temperature within fuel cartridge 36 decreases. The vapor PLNG fuel holding capacity of charcoal adsorbent 39 also increases as the pressure within fuel cartridge 36 increases. In the highly unlikely and extreme case where the pressure of PLNG fuel in storage container 10 tank exceeds the design value, vapor PLNG fuel is vented into fuel cartridge 36 to relieve further pressure build up. In one embodiment, fuel cartridge 36 is intended to be used in the unlikely event of an emergency venting due to a protracted period of non-use immediately following a refueling event. Therefore as part of general engine maintenance, fuel cartridge 36 is preferably replaced after such a protracted period of non-use. In one embodiment, the cost of replacement is minimal since fuel cartridge 36 is reused after simple regeneration of charcoal adsorbent 39 by heat input. Normally-opened solenoid valve 38 is closed prior to and during removal of fuel cartridge 36 and remains closed until opened during the regeneration process.

In another embodiment of this invention, fuel cartridge 36 is an active part of the PLNG fuel storage system and is, therefore, simply an adsorbent cartridge for additional storage of PLNG fuel. In this embodiment, fuel cartridge 36 with charcoal adsorbent 39 incorporates regeneration heater (s) (not shown in the drawings). Check valve 37 is replaced by a normally closed solenoid valve (not shown in the drawings) which is opened when the pressure of PLNG fuel in storage container 10 reaches a predetermined set point, preferably well below the design pressure, to establish flow of vapor PLNG fuel into fuel cartridge 36. Once the pressure of PLNG fuel in storage container 10 drops below the pressure of vapor PLNG fuel in fuel cartridge 36, the embedded regeneration heater(s) in fuel cartridge 36 begin to regenerate charcoal adsorbent 39, driving the vapor PLNG fuel back into storage container 10 for subsequent delivery to engine 24.

Vehicles fueled via PLNG and the fuel storage and delivery systems of this invention offer a driving range between refueling comparable to that of current gasoline engines. The low storage pressure compared to that of CNG and high storage temperature compared to that of LNG minimize safety concerns. In contrast to LNG, the high-pressure storage of PLNG facilitates supply of fuel to medium-pressure fuel-injectors, thus eliminating the need for the complex and expensive delivery system requiring a cryogenic pump that is associated with LNG. Finally, unlike LPG, PLNG is based on natural gas with abundant supply all over the world.

While the foregoing invention has been described in terms of one or more preferred embodiments, those having normal skill in the art will recognize various changes, modifications, additions and applications other than those specifically mentioned herein that may be made without departing from the scope of the invention, which is set forth in the following claims.

Glossary of terms:

$Ac_1$ transformation temperature: the temperature at which austenite begins to form during heating;

$Ac_3$ transformation temperature: the temperature at which transformation of ferrite to austenite is completed during heating;

$Ar_1$ transformation temperature: the temperature at which transformation of austenite to ferrite or to ferrite plus cementite is completed during cooling;

$Ar_3$ transformation temperature: the temperature at which austenite begins to transform to ferrite during cooling;

cryogenic temperatures: temperatures lower than about −40° C. (−40° F.);

CTOD: crack tip opening displacement;

CVN: Charpy-V-notch;

DBTT (Ductile to Brittle Transition Temperature): delineates the two fracture regimes in structural steels; at temperatures below the DBTT, failure tends to occur by low energy cleavage (brittle) fracture, while at temperatures above the DBTT, failure tends to occur by high energy ductile fracture;

essentially: substantially 100 vol %;

$Gm^3$: billion cubic meters;

GMAW: gas metal arc welding;

hardening particles one or more of $\epsilon$-copper, $Mo_2C$, or the carbides and carbonitrides of niobium and vanadium;

HAZ: heat affected zone;

intercritical temperature range: from about the $Ac_1$ transformation temperature to about the $Ac_3$ transformation temperature on heating, and from about the Ar3 transformation temperature to about the $Ar_1$ transformation temperature on cooling;

$K_{IC}$: critical stress intensity factor;

kJ: kilojoule;

kPa: thousands of Pascals;

ksi: thousands of pounds per square inch;

low alloy steel: a steel containing iron and less than about 10 wt % total alloy additives;

MA: martensite-austenite;

maximum allowable flaw size: critical flaw length and depth;

$Mo_2C$: a form of molybdenum carbide;

MPa: millions of Pascals;

$M_s$ transformation temperature: the temperature at which transformation of austenite to martensite starts during cooling;

opened (in reference to a valve): at least partially opened, unless otherwise specified;

PLNG: pressurized liquefied natural gas;

predominantly: at least about 50 volume percent;

ppm: parts-per-million;

psia: pounds per square inch absolute;

quenching: accelerated cooling by any means whereby a fluid selected for its tendency to increase the cooling rate of the steel is utilized, as opposed to air cooling;

quenching (cooling) rate: cooling rate at the center, or substantially at the center, of the plate thickness;

Quench Stop Temperature: the highest, or substantially the highest, temperature reached at the surface of the plate, after quenching is stopped, because of heat transmitted from the mid-thickness of the plate;

QST: Quench Stop Temperature;

slab: a piece of steel having any dimensions;

TCF: trillion cubic feet;

tensile strength: in tensile testing, the ratio of maximum load to original cross-sectional area;

TIG welding: tungsten inert gas welding;

$T_{nr}$ temperature: the temperature below which austenite does not recrystallize;

USPTO: United States Patent and Trademark Office; and weldment: a welded joint, including: (i) the weld metal, (ii) the heat-affected zone (HAZ), and (iii) the base metal in the "near vicinity" of the HAZ. The portion of the base metal that is considered within the "near vicinity" of the HAZ, and therefore, a part of the weldment, varies depending on factors known to those skilled in the art, for example, without limitation, the width of the weldment, the size of the item that was welded, the number of weldments required to fabricate the item, and the distance between weldments.

We claim:

1. A fuel storage container suitable for use in a fuel storage and delivery system for storing pressurized liquefied natural gas fuel at a pressure of about 1035 kPa (150 psia) to about 7590 kPa (1100 psia) and at a temperature of about −123° C. (−190° F.) to about −62° C. (−80° F.) and delivering vaporized pressurized liquefied natural gas fuel on demand for combustion in an engine, wherein said fuel storage container is constructed by joining together a plurality of discrete plates of materials comprising an ultra-high strength, low alloy steel containing less than 9 wt % nickel and having a tensile strength greater than 830 MNa (120 ksi) and a DBTT lower than about −73° C. (−100° F.), and wherein joints between said discrete plates have adequate strength and toughness at said pressure and temperature conditions to contain said pressuized liquefied natural gas.

2. The container of claim 1, wherein said joints have a strength of at least about 90% of the tensile strength of said ultra-high strength, low alloy steel.

3. The container of claim 1, wherein said joints have a DBTT lower than about −73° C. (−100° F.).

4. The container of claim 1, wherein said joints are formed by gas metal arc welding.

5. The container of claim 1, wherein said joints are formed by tungsten inert gas welding.

6. The fuel storage container of clam 1, where said fuiel storage container is connected to a fuel cartridge for collecting vapor pressurized liquefied natural gas fuel vented from said faiel storage container when the pressure of said pressurized liquefied natural gas fuel in said fiuel storage container exceeds a preset pressure.

7. The fiuel storage container of claim 6, wherein said fuel cartridge comprises an adsorbent.

8. The fuel storage container of claim 7, wherein said adsorbent is a charcoal adsorbent.

9. The fixel storage container of claim 8, wherein said fuel cartridge comprises at least one embedded heater for regenerating said charcoal adsorbent.

10. A system comprising:
(a) at least one fuel storage container for storing pressurized liquefied natural gas at a pressure of about 1035 kPa (150 psia) to about 7590 kPa (1100 psia) and at a temperature of about −123° C. (−190° F.) to about −62° C. (−80° F.), wherein said at least one fuel storage container is constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), and wherein joints between said discrete plates have adequate strength and toughness at said pressure and temperature conditions to contain said pressurized liquefied natural gas; and
(b) facilities for delivering vaporized pressurized liquefied natural gas fiel on demand for combustion in an engine.

11. A fuel storage and delivery system comprising:
(a) at least one fuel storage container, wherein said at least one fuel storage container has adequate strength and toughness to contain pressurized liquefied natural gas fuel at a pressure of about 1035 kPa (150 psia) to about 7590 kPa (1100 psia) and at a temperature of about −123° C. (−190° F.) to about −62° C. (−80° F.);
(b) a fill and vent valve for allowing transfer of said pressurized liquefied natural gas fuel between said fuel storage container and a refueling station;
(c) a liquid line for allowing flow of liquid pressurized liquefied natural gas fuel from said fuel storage tank to a vaporizer;
(d) a vapor line for allowing flow of vaporized pressurized liquefied natural gas fuel from said fuel storage tank to said vaporizer;
(e) a fuel line for allowing flow of said vaporized pressurized liquefied natural gas fuel from said vaporizer to said engine; and
(f) a fuel regulator for regulating flow of said vaporized pressurized liquefied natural gas fuel from said vaporizer to said engine, such that said fuel storage and delivery system is adapted for storing said pressurized liquefied natural gas fuel at a pressure of about 1035 kPa (150 psia) to about 7590 kPa (1100 psia) and at atemperature of about −123° C. (−190° F.) to about −62° C. (−80° F.) and delivering said vaporized pressurized liquefied natural gas fuel on demand for combustion in an engine.

12. The fuel storage and delivery system of claim 11, further comprising:
(g) a fuel cartridge having at least one regeneration heater, said fuel cartridge being adapted to (i) receive excess pressurized liquefied natural gas fuel from said fuel storage container when the pressure in said fuiel storage container exceeds a first predetermined set point; (ii) store said excess pressurized liquefied natural gas fuel; and (iii) drive said excess pressurized liquefied natural gas fuel back into said fuel storage container when the pressure in said fuel storage container drops below a second predetermined set point.

13. A fuel storage container suitable for use in a fuel storage and delivery system for storing pressurized liquefied natural gas fuel at a pressure of about 1035 kPa (150 psia) to about 7590 kPa (1100 psia) and at a temperature of about −123° C. (−190° F.) to about −62° C. (−80° F.) and delivering vaporized pressurized liquefied natura gas fuel on demand for combustion in an engine, wherein said fuel storage container is constructed by joining together a plurality of discrete plates of materials comprising an ultra-high strength, low alloy steel containing less than about 2 wt % nickel and having adequate strength and fracture toughness to contain said pressurized liquefied natural gas, whereinjoints between said discrete plates have adequate strength and toughness at said pressure and temperature conditions to contain said pressurized liquefied natural gas.

14. A method comprising:
(a) placing pressurized liquefied natural gas fuel at a pressure of about 1035 kPa (150 psia) to about 7590 kPa (1100 psia) and at a temperature of about −123° C. (−190° F.) to about −62° C. (−80° F.) into at least one filel storage container, wherein said at least one fuel storage container has adequate strength and toughness to contain said pressurized liquefied natural gas fuel at said pressure and temperature conditions; and
(b) delivering vaporized pressurized liquefied natural gas fuel on demand for combustion in an engine.

15. A system comprising:
(a) at least one fuel storage container for storing pressurized liquefied natural gas fuel at a pressure of about 1035 kPa (150 psia) to about 7590 kPa ( 100 psia) and at a temperature of about −123° C. (−190° F.) to about −62° C. (−80° F.), wherein said at least one fuel storage container has adequate strength and toughness to contain said pressurized liquefied natural gas fuel at said pressure and temperature conditions; and
(b) facilities for delivering vaporized pressurized liquefied natural gas fuel on demand for combustion in an engine.

* * * * *

UNITED STATES PATENT AND TRADEMARK OFFICE
CERTIFICATE OF CORRECTION

PATENT NO. : 6,058,713
DATED : May 9, 2000
INVENTOR(S) : Bowen et al.

It is certified that error appears in the above-identified patent and that said Letters Patent is hereby corrected as shown below:

Column 1,
Line 60, delete "162º" and insert in place thereof -- -162º --;

Column 2,
Line 12, delete "Applications" and insert in place thereof -- application --;
Line 13, delete "Applications" and insert in place thereof -- Application --;
Line 24, delete "describe" and insert in place thereof -- describes --;

Column 5,
Line 2, delete "09/099649" and insert in place thereof -- 09/099152 and has been published in WO 99/32671 --;
Line 22, delete "provisional";
Line 26, delete "60/068194" and insert in place thereof -- 09/099649 --;

Column 8,
Line 17, delete "(1.8SF.sec)" and insert in place thereof -- (1.8ºF/sec) --;

Column 9,
Line 10, delete "110º C" and insert in place thereof -- 10º C --;

Column 15,
Line 9, delete "(100º F)" and insert in place thereof -- (-100º F) --;
Line 10, delete "106º C" and insert in place thereof -- -106º C --;

Column 18,
Lines 25 and 40, delete "IO" and insert in place thereof -- 10 --;

Column 19,
Line 52, delete "of 7" and insert in place thereof -- 7 of --;

Column 24,
Line 7, delete "II" and insert in place thereof -- 11 --;

Column 26,
Line 58, delete, "where said fuiel" and insert in place thereof -- wherein said fuel --;
Line 61, delete "faiel" and insert in place thereof -- fuel --;
Line 62, delete "fiuel" and insert in place thereof -- fuel --;

UNITED STATES PATENT AND TRADEMARK OFFICE
CERTIFICATE OF CORRECTION

PATENT NO. : 6,058,713
DATED : May 9, 2000
INVENTOR(S) : Bowen et al.

It is certified that error appears in the above-identified patent and that said Letters Patent is hereby corrected as shown below:

Column 27,
Line 1, delete "fixel" and insert in place thereof -- fuel --;
Line 20, delete "fiel" and insert in place thereof -- fuel --;
Line 48, delete "atemperature" and insert in place thereof -- a temperature --;

Column 28,
Line 6, delete "fuiel" and insert in place thereof -- fuel --;
Line 33, delete "filel" and insert in place thereof -- fuel --;
Line 42, delete "100 psia" and insert in place thereof -- 1100 psia --.

Signed and Sealed this

Twenty-fifth Day of June, 2002

Attest:

JAMES E. ROGAN
Attesting Officer
Director of the United States Patent and Trademark Office